(12) United States Patent
Fuyuno

(10) Patent No.: US 8,428,667 B2
(45) Date of Patent: Apr. 23, 2013

(54) PORTABLE TERMINAL DEVICE

(75) Inventor: Tetsuya Fuyuno, Tokyo (JP)

(73) Assignee: NEC Corporation, Tokyo (JP)

( * ) Notice: Subject to any disclaimer, the term of this patent is extended or adjusted under 35 U.S.C. 154(b) by 355 days.

(21) Appl. No.: 12/810,167

(22) PCT Filed: Dec. 17, 2008

(86) PCT No.: PCT/JP2008/072916
§ 371 (c)(1),
(2), (4) Date: Jun. 23, 2010

(87) PCT Pub. No.: WO2009/084432
PCT Pub. Date: Jul. 9, 2009

(65) Prior Publication Data
US 2010/0281416 A1    Nov. 4, 2010

(30) Foreign Application Priority Data
Dec. 27, 2007    (JP) .................................. 2007-337262

(51) Int. Cl.
*H04W 88/00* (2009.01)
(52) U.S. Cl.
USPC .................... 455/575.4; 455/575.1; 455/90.3; 345/168; 715/773
(58) Field of Classification Search .................. 715/773; 345/168–178; 455/575.1–4, 90.3, 128, 347
See application file for complete search history.

(56) References Cited

U.S. PATENT DOCUMENTS

| | | | | |
|---|---|---|---|---|
| 6,141,540 A | * | 10/2000 | Richards et al. | 455/575.3 |
| 7,580,736 B2 | * | 8/2009 | Ronkko et al. | 455/575.3 |
| 2003/0064688 A1 | * | 4/2003 | Mizuta et al. | 455/90 |
| 2005/0179654 A1 | | 8/2005 | Hawkins et al. | |
| 2006/0229116 A1 | * | 10/2006 | Ishihara et al. | 455/575.3 |
| 2006/0287015 A1 | * | 12/2006 | Dunko | 455/575.4 |
| 2007/0037618 A1 | | 2/2007 | Fan | |
| 2007/0087792 A1 | * | 4/2007 | Teuri et al. | 455/575.1 |
| 2007/0093281 A1 | | 4/2007 | Park | |
| 2008/0119248 A1 | * | 5/2008 | Nissen et al. | 455/575.4 |

FOREIGN PATENT DOCUMENTS

| | | |
|---|---|---|
| CN | 1747496 A | 3/2006 |
| CN | 1913538 A | 2/2007 |
| CN | 1953472 A | 4/2007 |
| EP | 1298909 A1 | 4/2003 |

(Continued)

OTHER PUBLICATIONS

International Search Report for PCT/JP2008/072916 mailed Feb. 17, 2009.
Chinese Office Action for CN200880123221.0 mailed on Aug. 22, 2012.

(Continued)

*Primary Examiner* — Cong Tran

(57) ABSTRACT

A potable terminal device comprises an upper housing including a display unit on the surface thereof and a lower housing including a hard key on the surface thereof and relatively slidably coupled to the upper housing. Bothe of the housings are movable between a closed position in which all hard keys of the lower housing is covered with the upper housing, at least one intermediate position in which part of the hard keys are uncovered with the upper housing, and a full open position in which all of the hard keys are uncovered with the upper housing. In the intermediate position, in response to pressing any of part of the hard keys which are uncovered, a soft key for complementing part of the hard keys which are uncovered is displayed in a position starting from the edge of the display unit adjacent to the hard keys.

17 Claims, 11 Drawing Sheets

| | FOREIGN PATENT DOCUMENTS | | |
|----|----|----|----|
| GB | 2393066 A | 3/2004 | |
| JP | 2000010713 A | 1/2000 | |
| JP | 2003179678 A | 6/2003 | |
| JP | 2005191834 A | 7/2005 | |

OTHER PUBLICATIONS

European search report for EP08867102.9 dated Jan. 28, 2013.

* cited by examiner

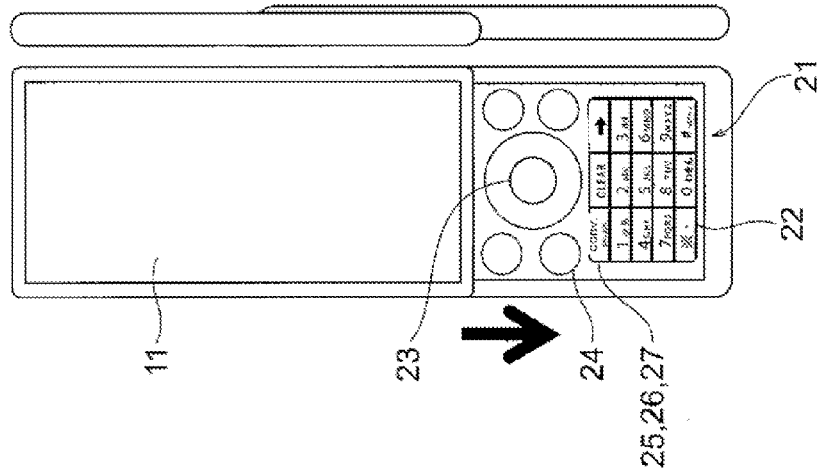
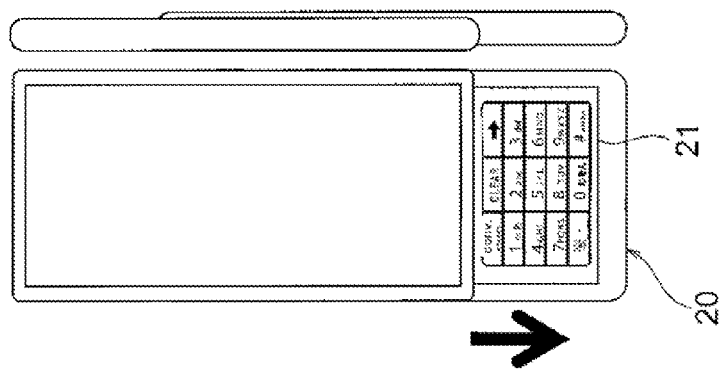
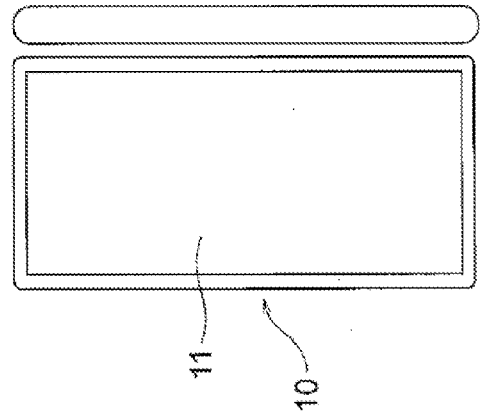

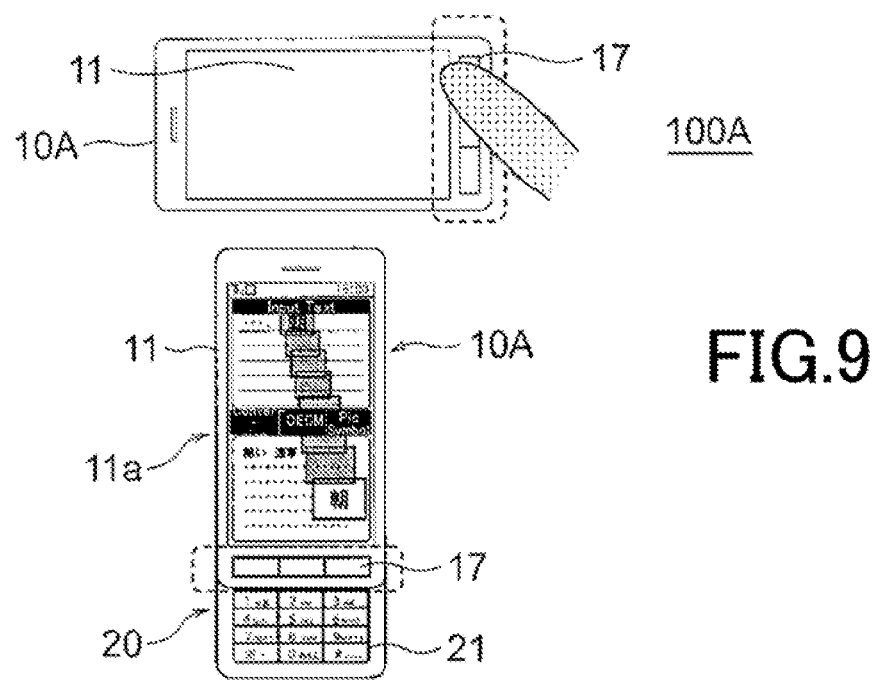
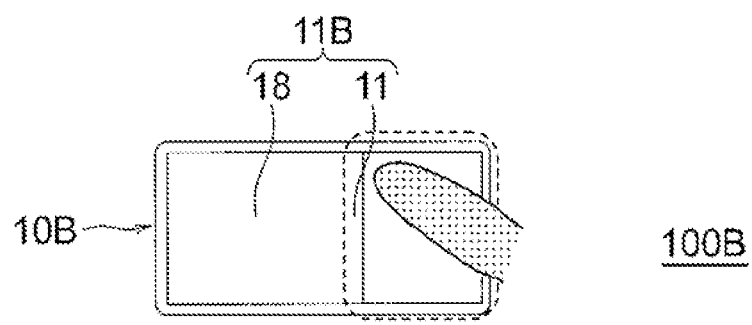
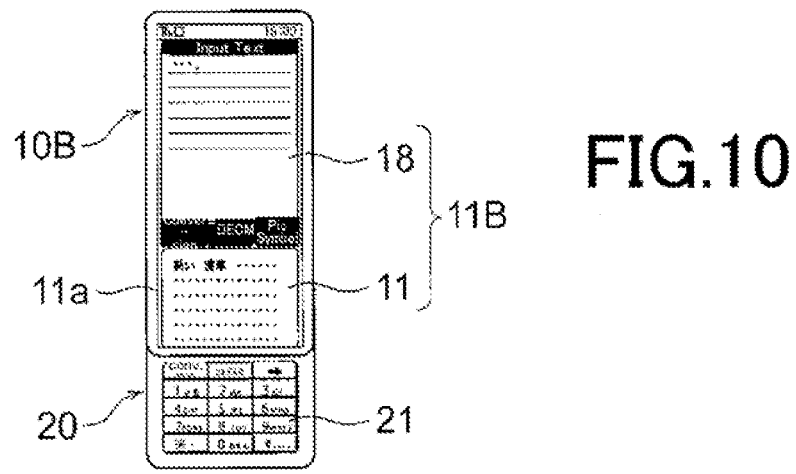
FIG.9
FIG.10

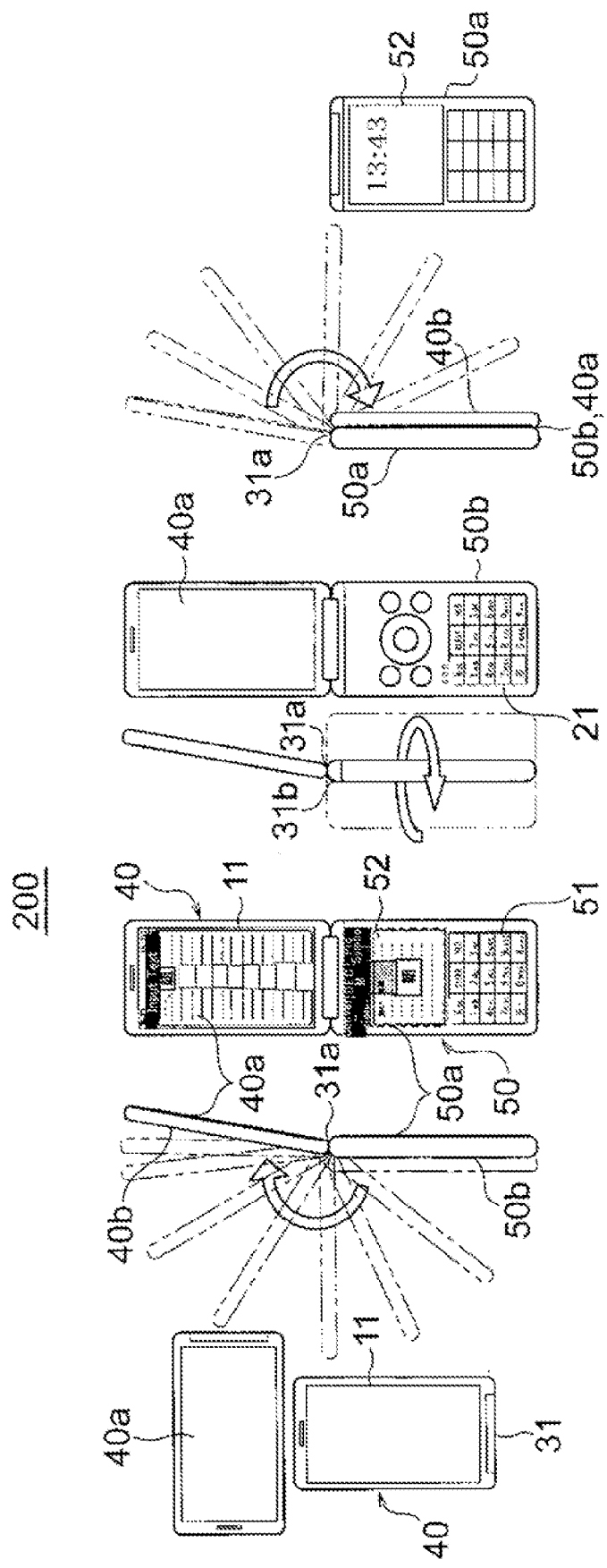

PORTABLE TERMINAL DEVICE

TECHNICAL FIELD

The present invention relates to a portable terminal device, more particularly a portable terminal device including an upper housing that has a display unit composing a touch panel on a surface thereof and a lower housing that has hard keys on a surface thereof.

BACKGROUND ART

Recently, functions of portable terminal devices such as cell phones have become more diverse. For example, portable terminal devices that have an e-mail sending/receiving function and an internet connection function are widely prevalent. Users of the portable terminal devices frequently use these functions and in doing so they use a touch panel (hereinafter also referred to as a soft key) or hard keys to input characters.

As examples of the portable terminal devices, those with only a soft key and without hard keys and those with hard keys composed of alphabetic, keys (Qwerty keys) and a soft key are well known. In the portable terminal devices without hard keys, users input characters only by a soft key, which may cause more inputting errors and put a burden on the users.

Meanwhile, although in the portable terminal devices with Qwerty keys, since users input characters with both hands, the speed of character input tends to be faster, one-hand character input using a thumb, which is the most common among character input operations of cell phones and the like, cannot be performed.

Patent Literature 1 describes a cell phone having a slide structure in which a front side unit and a back side unit are coupled by slide engaging means. It describes the art that this cell phone has a plurality of stages of slide locking positions and a touch panel function of a display unit is controlled depending on each of the positions in order to increase its usability. FIG. 7 and paragraph [0072] of the Patent Literature 1 describe that touch panel control means controls a touch panel such that each portion of the touch panel is separately controlled to be enabled or disabled depending on each of the slide locking positions.

Patent Literature 1: Unexamined Japanese Patent Application KOKAI Publication No. 2003-179678

DISCLOSURE OF THE INVENTION

Problems to be Solved by the Invention

In the cell phone described in the Patent Literature 1, a touch panel function is allocated to each of specific areas on the display unit and the allocated touch panel function is controlled to be enabled or disabled area by area depending on the slide locking position. In other words, the touch panel function is partially enabled depending on the slide locking position, and one-hand character input using a thumb is not taken into consideration. For example, in this cell phone, regardless of whether an effective area of the touch panel function at the front side unit is increased or decreased, when the position of the effective area has a large distance from hard keys at the back side unit, a thumb is difficult to reach the effective area and therefore one-hand character input is difficult.

The present invention is intended to provide a portable terminal device that allows for easier one-hand character input operation by combining a soft key and hard keys.

Means for Solving Problem

The present invention, according to a first aspect, provides a portable terminal device including an upper housing that has a display unit on a surface thereof thereof and a lower housing that has hard keys on a surface thereof and relatively slidably coupled to the upper housing, both of the housings being movable between a closed position in which all the hard keys of the lower housing are covered with the upper housing, at least one intermediate position in which part of the hard keys are not covered with the upper housing, and a fully open position in which none of the hard keys are covered with the upper housing. In the intermediate position, in response to depressing any of the part of the hard keys that are not covered, a soft key for complementing the part of the hard keys that are not covered is displayed in a position starting from an edge of the display unit adjacent to the hard keys.

The present invention, according to a second aspect, provides a portable terminal device that includes an upper housing having a display unit on a surface thereof and a lower housing having hard keys on a surface thereof and relatively slidably coupled to the upper housing, both of the housings that are migratable between a closed position in which all of the hard keys of the lower housing are covered with the upper housing, a plurality of intermediate positions in which part of the hard keys are not covered with the upper housing, and a fully open position in which none of the hard keys are covered with the upper housing. In the plurality of intermediate positions, corresponding to each of the intermediate positions, a soft key for complementing the part of the hard keys that are not covered is displayed in a position starting from an edge of the display unit adjacent to the part of the hard keys that are not covered.

The present invention, according to a third aspect, provides a portable terminal device that includes an upper housing having a display unit on a surface thereof and a lower housing having hard keys on a first surface thereof and being rotatably coupled to the upper housing by a hinge wherein a second surface of the lower housing has second hard keys with the same function of at least part of the first hard keys thereon, a soft key for complementing the second hard keys is displayed adjacent to the second hard keys.

Effect of the Invention

In the portable terminal device according to the first aspect of the present invention, in response to depressing the part of hard keys that are not covered in an intermediate position, a soft key for complementing the part of hard keys that are not covered is displayed in a position starting from an edge of a display unit adjacent to the hard keys. Thus, during character input by the hard keys in the intermediate position, the soft key can be displayed with small distance from the hard keys and therefore the character input by combining the soft key and hard keys can be easily operated with one hand in the intermediate position.

In the portable terminal device according to the second aspect of the present invention, a soft key for complementing the part of hard keys that are not covered in a plurality of intermediate positions is displayed in a position starting from an edge of a display unit adjacent to the hard keys. Thus, distance between the soft key and hard keys is small in any of the intermediate positions and therefore character input by combining the soft key and hard keys can be easily operated with one hand in the plurality of intermediate positions.

In the portable terminal device according to the third aspect of the present invention, a lower housing has first hard keys on one surface thereof and second hard keys on the other surface thereof and the soft key is displayed adjacent to the second hard keys. By this configuration, when a surface of the upper housing and one surface of the lower housing are made to be continuous each other by a hinge, character input can be performed using only the first hard keys and when the surface of the upper housing and the other surface of the lower housing are made to be continuous each other, character input by combining the soft key and second hard keys can be easily performed with one hand.

The aforementioned and other objects, features, characteristics and benefits of the present invention will become apparent by the following description with reference to drawings.

BRIEF DESCRIPTION OF THE DRAWINGS

FIGS. 1A to 1C are outside views illustrating a closed position, an intermediate position and an open position of a housing of a portable terminal device according to a first embodiment of the present invention, respectively.

FIG. 9 is a front view of a portable terminal device according to a second embodiment of the present invention.

FIG. 10 is a front view of a portable terminal device according to a third embodiment of the present invention.

FIGS. 12A to 12D are outside views illustrating a plurality of postures of a housing of a portable terminal device according to a fifth embodiment of the present invention.

BEST MODE FOR CARRYING OUT THE INVENTION

Figure 2A:
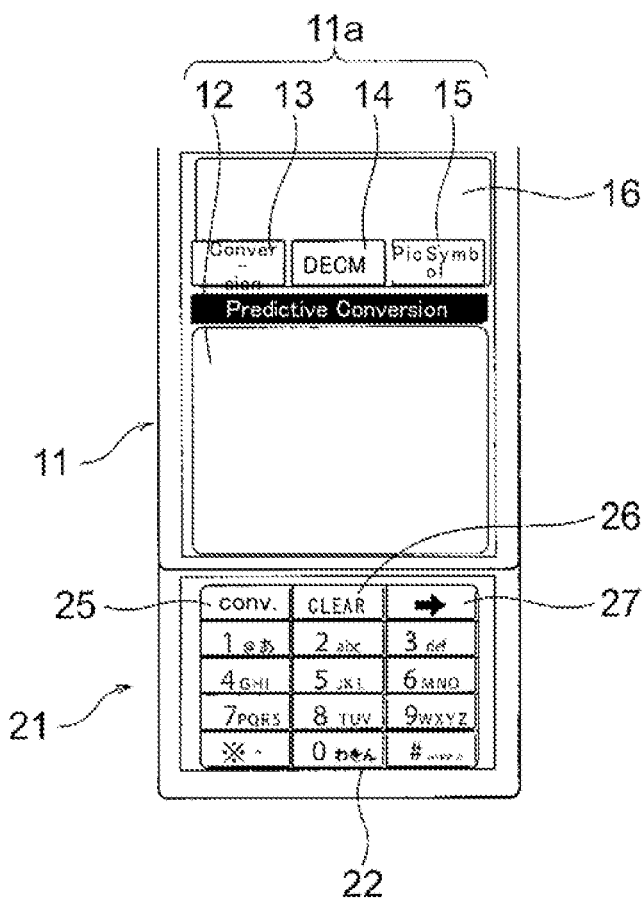
FIGS. 2A and 2B are front views of a housing illustrating the state in which the portable terminal device is being operated in the intermediate position shown in FIG. 1B.

Embodiments of the present invention can be described below with reference to accompanying drawings. In the drawings, similar elements have similar numbers.

FIGS. 1A to 1C are outside views illustrating a closed position, an intermediate position and an open position of a housing of a portable terminal device 100 according to a first embodiment of the present invention, respectively. Each outside view includes a front view and a side view. The portable terminal device 100 is a portable information processing device such as typically a cell phone and has various functions such as a communication function allowing for phone call, e-mail sending/receiving, and Internet connection, a camera function, and a broadcasting receiving function. The portable terminal device 100 includes an upper housing 10, a lower housing 20, and a sliding mechanism (not shown) that slidably holds in a stepwise fashion and couples the upper housing 10 and lower housing 20.

The upper housing 10 has a display unit 11 composing a touch panel on a surface thereof. The touch panel (display unit) 11 displays a soft key that becomes available depending on a slide locking position and input by a hard key. The lower housing 20 has hard keys 21 on a surface thereof. The hard keys 21 include a numeric keypad 22, a four direction key 23 and function keys 24, and by depressing the hard keys various function of the portable terminal device 100 become available. As illustrated, the numeric keypad 22 includes character/symbol keys displaying numeric, kana and alphabetic characters, * and #, as well as conversion (conv.) key 25, a clear key 26 and a right direction key 27 that are placed on top of these alphabet/symbol keys.

The portable terminal device 100 can be shifted to a plurality of positions (modes) by the slide mechanism and has, for example, a closed position (full closed mode) as illustrated in FIG. 1A in which all of the hard keys 21 of the lower housing 20 are covered with the upper housing 10, an intermediate position (intermediate mode) as illustrated in FIG. 1B in which the numeric keypad 22 that is part of the hard keys 21 is not covered with (exposed from) the upper housing 10 and a fully open position (fully open mode) as illustrated in FIG. 1C in which none of the hard keys 21 are covered with the upper housing 10. In the closed position, various functions except for character input can be performed only with the touch panel 11 of the upper housing 10. In the fully open position, a conventional one-hand character input operation in which the hard keys 21 of the lower housing 20 are pressed with a thumb to select and decide characters as well as other various operations can be performed.

Figure 2B:
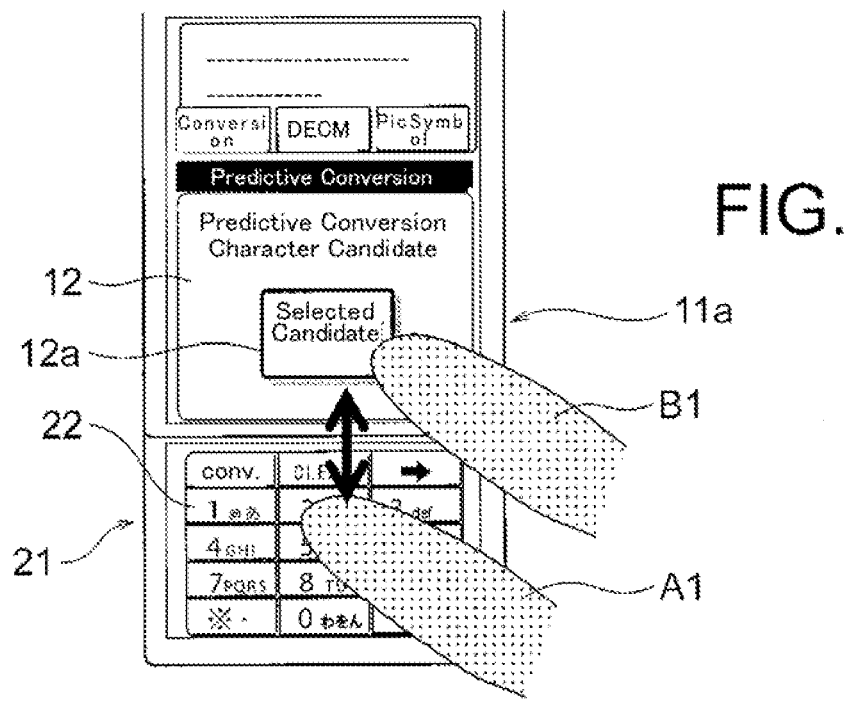

FIGS. 2A and 2B illustrate a state in which character input operation is being performed in the intermediate position in the portable terminal device according to the present embodiment. In the intermediate position, a soft key area 11a and a text display area 16 are displayed in a position starting from an edge of the touch panel 11 adjacent to the hard keys 21. The soft key area 11a is displayed, for example, in response to depressing a numeric keypad 22 during character input by the hard keys 21. The soft key area 11a, as illustrated in FIG. 2A, includes a candidate display area 12, a normal conversion switching key (normal conversion key) 13, a decoration mail (DECM) switching key (decoration mail key: DECM key) 14 and a pictorial symbol switching key (pictorial symbol key: PicSymbol Key) 15. The candidate display area 12 displays character candidates that have been converted in a predictive conversion mode or a normal conversion mode, pictorial symbol candidates in a pictorial symbol conversion mode, and various templates, decorations and the like to be used for creating decoration mails.

The normal conversion mode is a kana-kanji conversion mode in which kana characters that is a phonogram are converted into a character string including kanji characters that is an ideogram. When a user inputs a kana character, a plurality of character candidates are displayed including a kanji character or a character string composed of kanji and kana characters corresponding to the key-inputted kana character. When the user selects any of the character candidates, one character string candidate is selected and is inserted into a sentence, and then key-inputted kana character is converted to a character string corresponding to the inserted character string candidate. In the predictive conversion mode, when a kana character is key-inputted, a plurality of character candidates are displayed including a kanji character or a character string composed of kanji and kana characters that correspond to a kana character string composed of the key-inputted kana character and a kana character that is predicted to be inputted subsequent thereto. When the user selects any of the character string candidates, the same kana-kanji conversion as that in the normal conversion mode can be performed. The predictive conversion mode can reduce the number of times of key-inputting by the user, thereby reducing a key-inputting burden on the user.

The normal conversion key 13 is a key for switching the predictive conversion mode to the normal conversion mode, for example when a desired character candidate cannot be obtained in the predictive conversion mode. The decoration mail key 14 is used in creating a decoration mail. The pictorial symbol key 15 is used in displaying a pictorial symbol. Taking the user's usability into consideration, these switching keys 13 to 15 within the soft key area 11a may be properly allocated to character switching keys and the like that switch kana, kanji, numeric characters and the like. The text display area 16 displays one after another, for example, a character inputted by the hard keys 21 and a character or pictorial symbol selected and decided at the candidate display area 12, and displays a state in which a text is being created. Although the text display area 16 is part of the touch panel 11, a touch panel function is not used and only a function to display a text is used during character input.

In addition, since switching between the predictive conversion mode and normal conversion mode may be frequently used, the switching is possible by the normal conversion key 13 within the soft key area 11a as well as the conversion key 25 that is one of the hard keys 21. The clear key 26 that is one of the hard keys 21 is used, for example, in changing a predetermined operation. The right direction key 27 that is one of the hard keys 21 is used in continuously selecting characters within a same line.

The soft key area 11a displayed in an edge of the touch panel 11 in the intermediate position has a small distance from the numeric keypad 22 that is one of the hard keys 21. This configuration enables the user to adopt a state A1 in which the numeric keypad 22 is pressed with a thumb and a state B1 in which the candidate display area 12 within the soft key area 11a is touched by the thumb with hardly changing the positions of other fingers in the intermediate position, as illustrated in FIG. 2B. In this case, in response to depressing the numeric keypad 22 with a thumb of the user in the state A1, predictive conversion character candidates (i.e. converted character candidates) that were set as a default in character input in the predictive conversion mode are displayed at the candidate display area 12 in the state B1. In the state B1, furthermore, a character candidate is selected from the character candidates by a single touch operation and the selected character candidate 12a is enlarged and displayed.

The soft key area 11a displayed in the intermediate position complements functions of the four direction key 23, function key 24 and the like that are the hard keys 21 covered with the upper housing 10 during character input. Furthermore, as illustrated in the state B1, during character input, the text display area 16, where the touch panel function is not used, is displayed at the vicinity of an edge of the touch panel 11 apart from the hard keys 21, but the soft key area 11a is not displayed therein. As a result, in the intermediate position, since the soft key is not displayed, for example, in a position where a thumb cannot reach, the soft key and hard keys 21 can be seamlessly and smoothly operated with one hand. In this specification, "a complementing key (soft key)" means a key to be inputted subsequent to inputting the part of keys (hard keys) that are not covered or another key that composes a keyboard together with the part of keys that are not covered. It is called a complementing key because either key is inputted before or after the part of keys that are not covered.

The aforementioned embodiment illustrates an example having one intermediate position, but without limiting to this, a plurality of intermediate positions can be set. In such a case, a slide mechanism may be configured to hold the upper housing 10 and lower housing 20 in a plurality of positions between the closed position and fully open position, and the soft key area 11a that complements functions of the hard keys 21 that are covered may be displayed in a position starting from an edge of the touch panel 11 in a stepwise manner corresponding to each of the intermediate positions. In other words, each area on the touch panel 11 is not fixed with respect to a function of the soft key, and in no matter what display mode the soft key has, the soft key at the bottom is allocated to an edge of the touch panel 11 adjacent to the hard keys 21.

Figure 3:
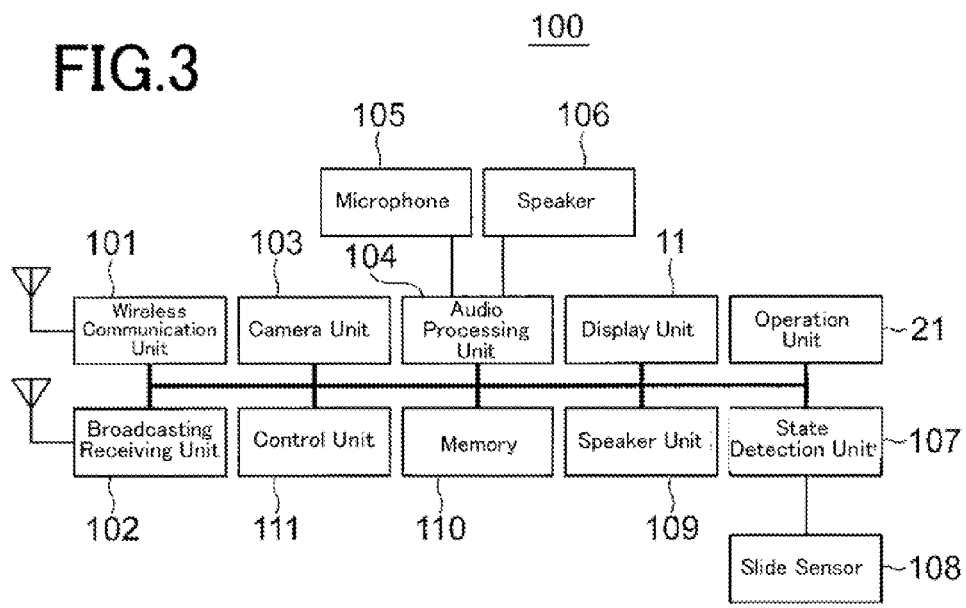
FIG. 3 is a block diagram illustrating a circuit configuration of the portable terminal device according to the first embodiment.

FIG. 3 is a block diagram illustrating a circuit portion of the portable terminal device 100. The portable communication terminal 100 includes, for example, a wireless communication unit 101, a broadcasting receiving unit 102, a camera unit 103, an audio processing unit 104, a microphone 105 as a transmitter, a speaker 106 as a receiver, a display unit 11, an operation unit (hard keys) 21, a state detection unit 107, a slide sensor 108, a speaker unit 109, a memory 110 and a control unit 111. The wireless communication unit 101 transmits a wireless signal to a radio base station device (not shown) and receives a wireless signal therefrom via antenna. The broadcasting receiving unit 102 receives via antenna a TV broadcasting signal transmitted from a broadcasting station such as an earth station and a satellite and processes the received broadcasting signal such as video data, audio data and information data signal by demodulation. The camera unit 103 obtains (captures) an image information. The audio processing unit 104 processes an audio signal inputted through the microphone 105 or outputted through the speaker 106.

The display unit 11 has a display function that performs display output (video signal processing) of information such as an image, a graphic, a character and a symbol, and a switching function (touch panel function) that senses a user's input operation with the use of pressure, electrostatic capacity and the like. The operation unit 21 includes the aforementioned numeric keypad 22 and the like, thereby enabling the user to input various kinds of information to the portable terminal device 100. The state detection unit 107 detects a sliding state of the upper housing 10 and lower housing 20 with a slide sensor 108 such as a magnetic/hall element and a convex/press switch. The speaker unit 109 performs a ringtone output such as a musical tone and a ring alert. The memory 110 stores address information, sending/receiving e-mail information, outgoing/incoming call information, content information, application program information, captured images and the like and also maintains various settings of the portable terminal device 100. The control unit 111 controls telephone, e-mail, internet connection, camera, television receiving, content reproduction and other various functions as well as each of the units.

Figure 4A:
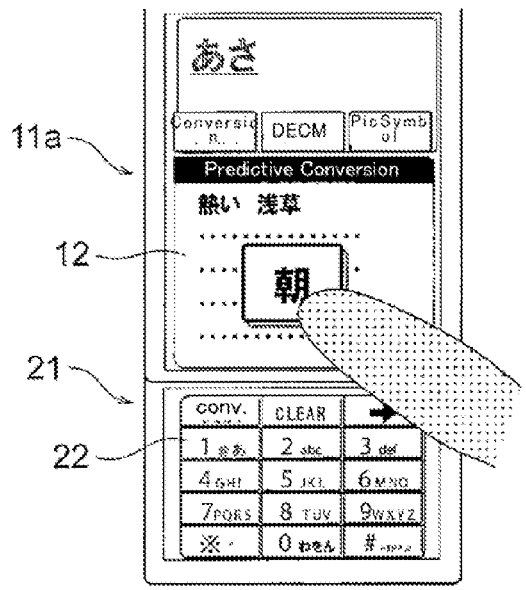
FIGS. 4A and 4B are front views of the housing that shows content displayed on a display unit when predictive conversion is performed in the intermediate position illustrated in FIG. 1B.
Figure 4B:
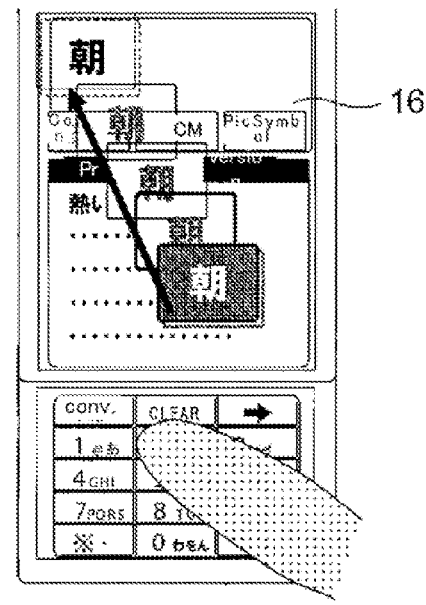

Next, operation of the portable terminal device 100 will be described in detail. FIGS. 4A and 4B sequentially illustrate display contents during character input operation in the predictive conversion mode in the intermediate position of the housing. First, when the user depresses a key displaying kana character "あ: a" of the numeric keypad 22, a plurality of character candidates that start from "a" sound such as "熱い: atsui (hot)" and "浅草: Asakusa (a geographical name)" in the predictive conversion mode are displayed in the candidate display area 12 as illustrated in FIG. 4A. Then, the user touches and selects with his/her thumb a portion where "朝: asa (morning)" i.e., the user's desired character candidate is displayed from the plurality of character candidates. The selected character candidate is enlarged and displayed as illustrated, and the text display area 16 displays its phonetic kana characters "あさ: asa". After that, when the user clears the selection by removing his/her thumb from the candidate display area 12, the character candidate is decided and "朝: asa (morning)" is displayed in the text display area 16 as illustrated in FIG. 4B. In this way, character input by combining the soft key and hard keys 21 allows for quick character selection and decision in the predictive conversion mode.

Figure 5A:
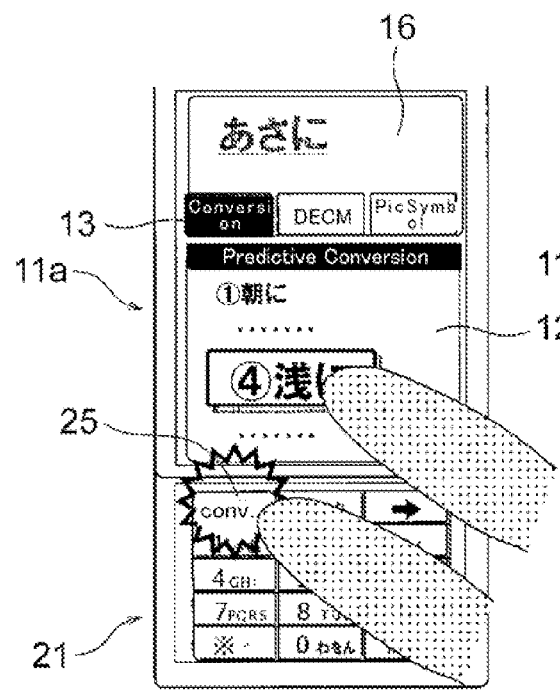
FIGS. 5A and 5B are front views of the housing illustrating a state in which character and pictorial symbol input is being performed in the intermediate position.

FIG. 5A illustrates a state in which character input is performed in the intermediate position in the normal conversion mode. It is assumed that there is no desired character candidate among character candidates displayed in the predictive conversion mode. In this case, when the user presses down the conversion key 25 that is one of the hard keys 21 or touches the normal conversion key 13 within the soft key area 11a, the predictive conversion mode is switched to the normal conversion mode. When the user presses "あさに: asani", a plurality of character candidates in the normal conversion mode are displayed in the candidate display area 12 as illustrated. The character candidates include a desired character candidate "1. 朝に: asani" as well as "4. 浅に: asani" that is not a desired character candidate. In FIG. 5A, "4. 浅に: asani" that is not a desired character candidate is enlarged and displayed. Then, a portion where a desired character candidate "1. 朝に: asani" is displayed is touched with a thumb and selected from the plurality of character candidates. The selected character candidate is enlarged and displayed. When the user releases his/her thumb from the candidate display area 12 to clear the selection, the character candidate 朝に: asani" is decided. In this way, character input by combining the soft key and hard keys 21 allows for quick character selection and decision in the normal conversion mode.

Figure 5B:
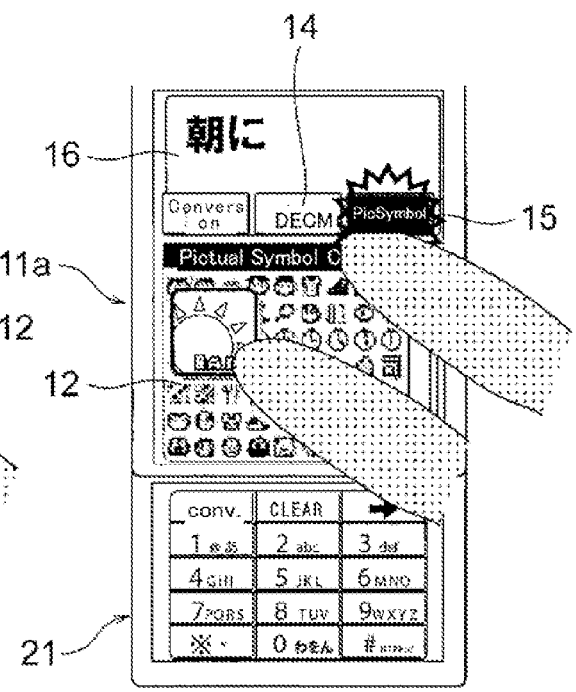

FIG. 5B illustrates operation of pictorial symbol input through the pictorial symbol keys in the intermediate position of the housing. It is assumed that subsequent to 朝に: asani" that has been decided and displayed in the text display area 16a, a pictorial symbol is inputted. In this case, when the user touches the pictorial symbol key 15 within the soft key area 11a, a plurality of pictorial symbol candidates are displayed in the candidate display area 12 as illustrated. Next, a portion, where a desired pictorial symbol candidate i.e., a pictorial symbol indicating "the sun" is displayed, is touched and selected from the plurality of pictorial symbol candidates. The selected pictorial symbol candidate is enlarged and displayed as illustrated. Then, when the user releases her/his thumb from the candidate display area 12 to clear the selection, the pictorial symbol candidate is decided. In this way, character input by combining the soft key and hard keys 21 allows for quick pictorial symbol selection and decision by the pictorial symbol key. Operation for creating a decoration mail is almost the same as that for inputting a pictorial symbol. For example, the decoration mail key 14 within the soft key area 11a is touched and then a desired template and the like displayed in the candidate display area 12 is selected and decided according to touch operation.

Figure 6A:
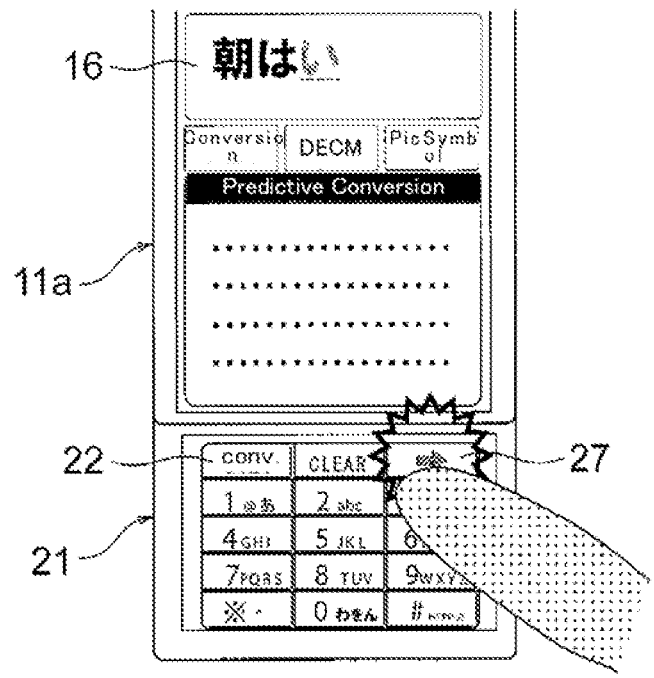
FIGS. 6A to 6C are front views of the housing sequentially illustrating the change of states during a specific operation in the portable terminal device according to the first embodiment.
Figure 6B:
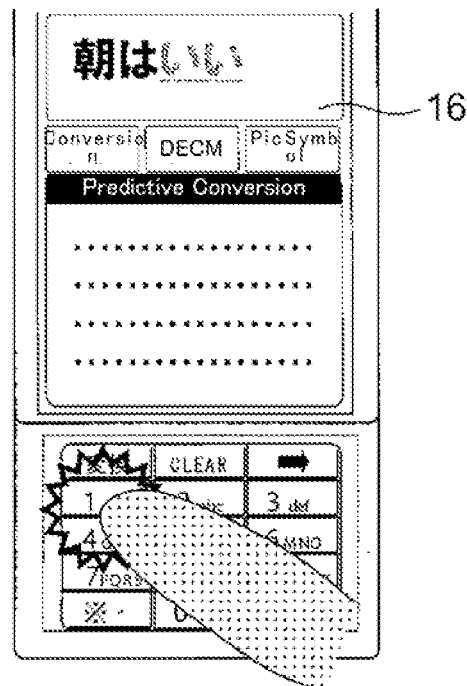
Figure 6C:
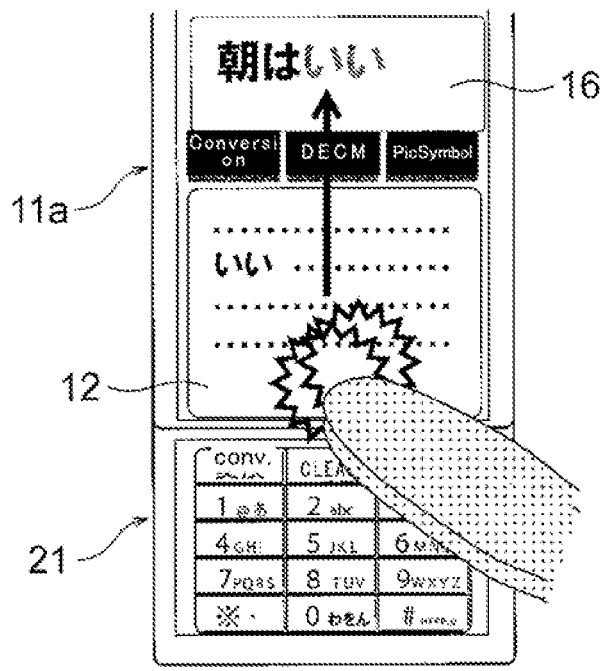

FIGS. 6A to 6C sequentially illustrate operation for selecting and deciding a character that does not require conversion in the intermediate position of the housing. It is assumed that, subsequent to "朝は: asaha" that has been decided and displayed in the text display area 16, a kana character "い: i" is inputted and then another kana character ""い: i" is inputted. In this case, when the user inputs a kana character "い: i" through the numeric keypad 22, the text display area 16 displays "い: i" subsequent to "朝は: asaha". After that, as illustrated in FIG. 6A, the right direction key 27 that is one of the hard keys 21 is pressed. As a result, the text display area 16 enters an input standby state in which a next character input is waited for, as illustrated in FIG. 6B; and then by depressing the same key of the numeric keypad 22, the text display area 16 displays another "い: i". In this way, since the right direction key 27 that is one of the hard keys 21 is disposed assuming that continuous selection of characters that are on the same line is frequently performed, it is possible to select a character exclusively with the hard keys 21 during character input by combining the soft key and hard keys 21.

Next, since "いい: ii", which is displayed subsequent to "朝は: asaha" in the text display area 16, does not require conversion, the user double-touches any portion of the candidate display area 12 to decide "いい: ii" as illustrated in FIG. 6C. In this way, a character that dose not require conversion can be quickly decided. The character that does not require conversion is not limited to kana characters, but may be numeric or alphabetic characters. "Double-touch" here means performing a plurality of single-touch operations within a predetermined time period.

Here, with reference to Table 1, the results will be described of comparing character input by the portable terminal device 100 according to the present embodiment with character input by a conventional portable terminal device as a comparative example. Table 1 shows, as an input method, character selection and decision in the predictive conversion mode, character selection and decision in the normal conversion mode and pictorial symbol selection and decision by the pictorial symbol key as well as the number of times of inputting required for each method, corresponding to each other.

TABLE 1

| Input Method | Number of Times of Inputting (Embodiment) | Number of Times of Inputting (Comparative Example) |
| --- | --- | --- |
| Character Selection and Decision by Predictive Conversion | Once | Twice to Several Times |
| Character Selection and Decision by Normal Conversion | Twice | Three to Several Times |
| Pictorial Symbol Selection and Decision by Switching Pictorial Symbols | Twice | Three Times to Some Dozen Times |

Table 1 shows that the portable terminal device 100 according to the present embodiment has smaller number of times of clicks (or touches) than that of the conventional portable terminal device. In this table; however, it is assumed that by depressing the numeric keypad 22 once and a desired character candidate or pictorial symbol candidate is already displayed on the touch panel 11 or a liquid crystal panel of the conventional portable terminal device. More specific descriptions will be as follows.

First, the number of times of inputting for character selection and decision in the predictive conversion mode will be described. In the portable terminal device 100, a desired character candidate displayed on the touch panel 11 is touched once with a thumb and then the thumb is released thereby to decide the character candidate. Therefore, the number of times of inputting is once. Meanwhile, in the conventional portable terminal device, a hard key is clicked once to several times to select a desired character candidate displayed on the liquid crystal panel and then a hard key is clicked once more to decide the selected character candidate. Thus, the number of times of inputting is two to several times in the conventional portable terminal device.

The number of times of inputting for character selection and decision in the normal conversion mode will be described. In the portable terminal device 100, the touch panel 11 (or the hard keys 21) is touched once to switch from the predictive conversion mode to the normal conversion mode. A desired character candidate displayed by switching to the normal conversion mode is touched once with a thumb and selected and then the thumb is released from the touch panel 11 thereby to decide the character candidate. Therefore, in the portable terminal device 100, the number of times of inputting is twice. Meanwhile, in the conventional portable terminal device, a hard key is clicked once to switch from the predictive conversion mode to the normal conversion mode and after that a hard key is clicked once to several times to select a desired character candidate displayed on the liquid crystal panel and a hard key is clicked once more to decide the selected character candidate. Therefore, in the conventional portable terminal device, the number of times of inputting is three to several times.

The number of times of inputting for pictorial symbol selection and decision will be described. In the portable terminal device 100, a touch panel 11 is touched once to switch, for example, from the predictive conversion mode to the pictorial symbol input mode. A desired pictorial symbol candidate displayed by depressing the pictorial symbol key is touched once with a thumb and selected and then the thumb is released from the touch panel 11 thereby to decide the pictorial symbol candidate. Therefore, in the portable terminal device 100, the number of times of inputting is twice. Meanwhile, in the conventional portable terminal device, a hard key is clicked once to switch from the predictive conversion mode to the pictorial symbol input mode and after that a hard key is clicked once to some dozen times to select a desired pictorial symbol candidate from a lot of pictorial symbol candidates displayed on the liquid crystal panel and a hard key is clicked once more to decide the selected pictorial symbol candidate. Therefore, in the conventional portable terminal device, the number of times of inputting is three times to some dozen times.

Figure 7:
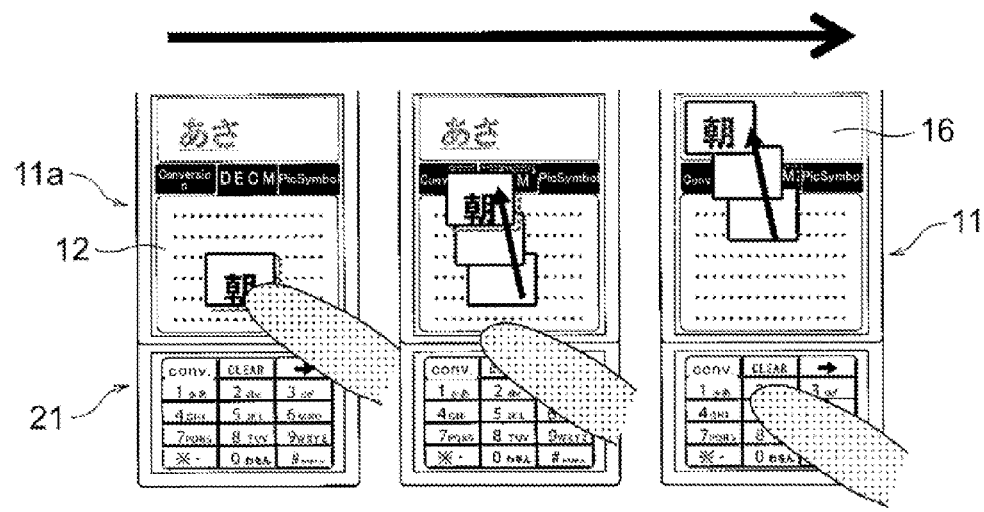
FIG. 7 is a front view of the housing sequentially illustrating the change of states during a specific operation in the portable terminal device according to the first embodiment.

FIG. 7 sequentially illustrates a visual movement display when a character string is created by character input in the intermediate position. In the portable terminal device 100, as described above, the user touches with a thumb and selects a character candidate in the predictive conversion mode and releases the thumb from the soft key area 11a thereby to decide the character candidate. In doing so, by key-inputting "あさ: asa", a corresponding kana character string is entered into the text input area 16. Then, as illustrated along an arrow in FIG. 7, the user touches with a thumb a desired kanji character, "朝: asa" displayed in the candidate display area 12 within the soft key area 11a. After that, when the thumb is released from the soft key area 11a to decide the character candidate, the touch panel 11 displays that a display of the selected character candidate moves from the candidate display area 12 to the text display area 16. With the use of such a visual movement display, the decided character candidate is displayed such that it moves to the text display area 16 and is inserted into the character string. Therefore, it is possible to produce a sense of speed by creating a text one after another and to emphasize novelty.

Figure 8:
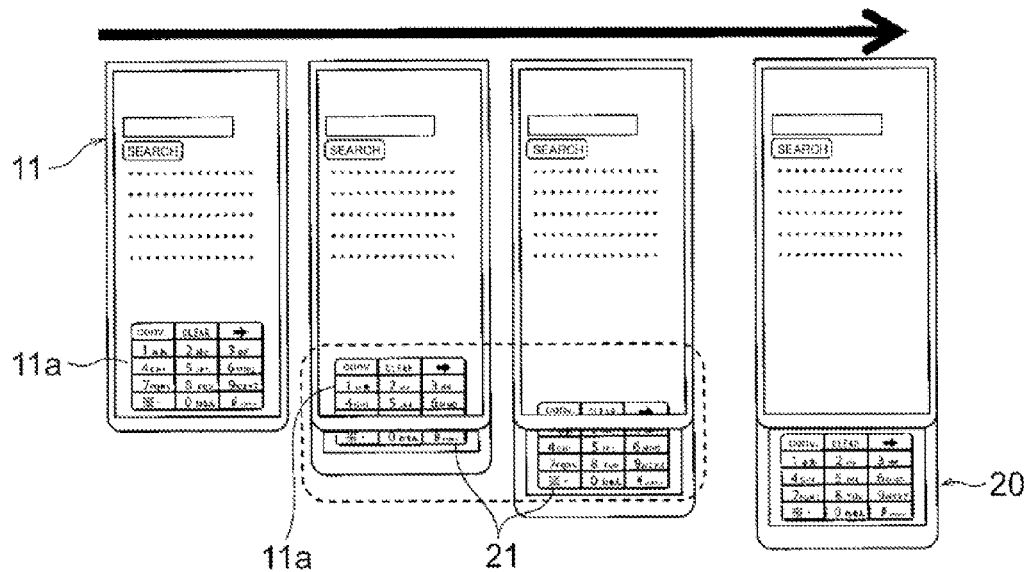
FIG. 8 is a front view of the housing sequentially illustrating a visual movement display when the closed position shifts to the intermediate position.

In the portable terminal device 100 according to the aforementioned embodiment, after a position of the housing shifts from the closed position to the intermediate position, depressing the hard keys 21 displays the soft key area 11a for complementing the hard keys 21 in a position starting from an edge of the touch panel 11. However, without limiting to this, when a position of the housing shifts from the closed position to the intermediate position, a visual movement display may be performed, for example, as illustrated in FIG. 8. Specifically, first, a soft key area 11a is displayed on the touch panel 11 in the closed position. Then, in the process of shifting to the intermediate position, a visual movement display is performed so as to give an impression that the soft key displayed in the touch panel 11 is seamlessly switched to the hard keys 21 on the lower housing 20 as illustrated along an arrow in FIG. 8. Such a visual movement display can emphasize novelty. The visual movement display is not limited to the time when the closed position shifts to the intermediate position, but may be performed when the intermediate position shifts to the closed position or when the fully open position shifts to the intermediate position.

In the portable terminal device 100 according to the present embodiment, the following advantageous effects are exhibited. Since distance between the soft key area 11a displayed on the touch panel 11 and the hard keys 21 exposed on the lower housing 20 is small in the intermediate position, a thumb can reach both of the soft key and hard keys 21 and therefore it is possible to perform character input with one hand by combining the soft key and hard keys 21. Furthermore, since selecting and deciding a character or pictorial symbol candidate with a soft key are performed almost simultaneously with a touch operation, the number of times of clicks in character input can be substantially reduced, compared with that of the conventional portable terminal device. As a result, it is possible to perform quick character input by combining the soft key and hard keys 21, thereby improving the user's operational performance.

Since conventional character input by the hard keys 21 can be performed in the fully open position of the housing, resources and the like are available to users who are not accustomed to operation of the touch panel 11 or prefer a conventional character input.

FIG. 9 illustrates a portable terminal device according to a second embodiment of the present invention. The lower illustration of FIG. 9 is a front view of the housing in the intermediate position and the upper illustration of FIG. 9 is a view in which the upper housing is rotated in the direction parallel to the surface of the housing with respect to the lower housing. A portable terminal device 100A according to the present embodiment is different from the portable terminal device according to the first embodiment in that in the former not only the touch panel 11 but also key switches 17 that are hard keys are disposed on an upper housing 10A. The key switches 17 are disposed between an edge of the touch panel 11 and a corresponding edge of the upper housing 10A and are composed of keys that have the same functions as those of the aforementioned conversion key 25, clear key 26 and right direction key 27 that are disposed on the uppermost of the hard keys 21 of the lower housing 20. This configuration can reduce a size of the touch panel 11 mounted on the upper housing 10A to, for example, about 3.5 inches in the portable terminal device 100A, thereby reducing its cost of manufacturing. In addition, in the portable terminal device 100A, it is possible to perform operation by combining the key switches 17 and soft key area 11a even in the closed position.

FIG. 10 illustrates, in a similar manner of FIG. 9, a portable terminal device according to a third embodiment of the present invention. A portable terminal device 100B according to the present embodiment is different from the portable terminal device according to the first embodiment in that in the former a portion of a display unit 11B on an upper housing 10B is the touch panel 11 and the remaining portion is a normal liquid crystal panel 18. Since the touch panel 11 of the upper housing 10B is disposed on an edge of the display unit 11B adjacent to the hard keys 21 of the lower housing 20, its distance from the hard keys 21 is small, thereby allowing for one hand character input with a thumb. In addition, the liquid crystal panel 18 of the upper housing 10B is disposed on a position apart from the hard keys 21 and has a size of, for example, about 2.8 inches. This configuration not only allows for character input by combining the soft key and hard keys 21, but also can reduce a size of the touch panel 11 mounted on the upper housing 10B to, for example, about 2.2 inches in the portable terminal device 100B, thereby reducing its cost of manufacturing.

Figure 11A:
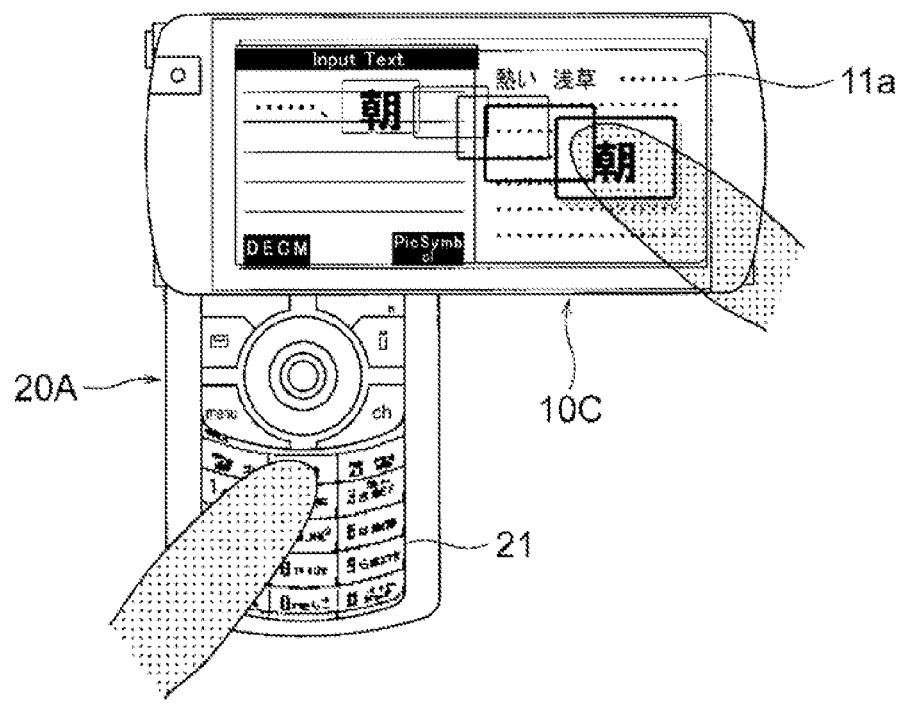
FIGS. 11A and 11B are front views illustrating postures of a housing of a portable terminal device in an open position according to a forth embodiment of the present invention.
Figure 11B:
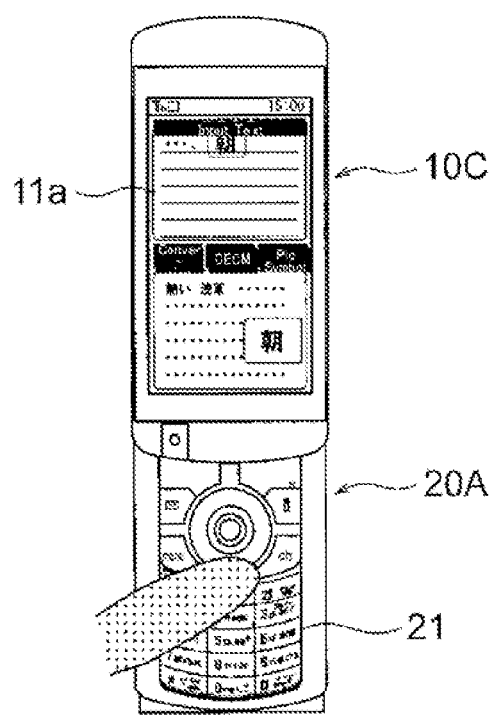

FIGS. 11A and 11B illustrate a portable terminal device according to a fourth embodiment of the present invention. A portable terminal device 100C is different from the portable terminal device according to the first embodiment in that in the former an upper housing 10C is rotatable from the closed position with respect to a lower housing 20A on the same surface as a sliding surface. The portable terminal device 100C takes a position illustrated in FIG. 11A in which the upper housing 10C rotates 90 degrees from the closed position with respect to the lower housing 20A as well as a position illustrated in FIG. 11B in which the upper housing 10C rotates 180 degrees from the closed position relative to the lower housing 20A. In the position illustrated in FIG. 11A, the user operates the hard keys 21 on the lower housing 20A with one hand and operates the soft key area 11a on the upper housing 10C with the other hand thereby to select and decide the predictive conversion mode and a candidate such as a pictorial symbol. In other words, in this position, since character input by combining the soft key and hard keys 21 enables to perform with both hands, quicker character input can be performed, compared with the aforementioned one-hand character input. The position illustrated in FIG. 11A is suitable for, for example, a situation in which the user sits in a train and performs high-speed character input with both hands.

In the position of the housing illustrated in FIG. 11B, distance between the hard keys 21 on the lower housing 20A and the soft key area 11a on the upper housing 10C is larger to some extent, compared with the position illustrated in FIG. 11A. However, this position allows for one-hand character input with a thumb by combining the soft key and hard keys 21. The position illustrated in FIG. 11B is suitable for, for example, a situation in which the user performs character input with one hand while holding a strap in a train. In this way, in the portable terminal device 100C, a character input style can be properly selected depending on a situation of the user.

In each of the aforementioned embodiments, description have been made on the portable terminal devices 100, 100A, 100B or 100C configured such that the upper housing 10, 10A, 10B or 10C includes the soft key area 11a that has the touch panel 11 disposed on the entire surface or on a portion of the surface thereof, the lower housing 20 or 20A includes the hard keys 21, and the upper housing and lower housing are slidably coupled to each other. However, the configuration of the portable terminal device is not limited to these embodiments. In other words, as long as a portable terminal device allows for character input by combining the soft key and hard keys 21, it may be configured such that the upper housing and lower housing are foldably connected to each other by a hinge.

FIGS. 12A to 12D illustrate a plurality of postures of a portable terminal device according to a fifth embodiment of the present invention. In a portable terminal device 200 according to the present embodiment, a hinge 31 enables the upper housing to rotate relative to the lower housing in a first rotation mode in which the upper housing rotates by a hinge 31 in the direction perpendicular to the housing surface between in the fully open position and in the fully open position as well as in a second rotation mode in which the upper housing rotates about an axis parallel to the housing surface in an almost fully open position. In other words, according to the present embodiment, the hinge 31 has a hinge structure 31a (hereinafter referred to as a reversible structure) that enables an upper housing 40 to rotate approximately 360 degrees with respect to a lower housing 50 as well as a hinge structure 31b (hereinafter referred to as a biaxial structure) that enables the lower housing 50 to reverse 180 degrees with respect to the upper housing 40.

With reference to FIGS. 12A to 12D, positions of the portable terminal device 200 will be described below. The touch panel 11 is mounted on a surface 40a of the upper housing 40 as illustrated in FIG. 12A. Regardless of whether the portable terminal device 200 is oriented in a longitudinal direction or in a lateral direction, a display changes according to the orientation and therefore various functions except for character input can be operated at both directions. In FIG. 12A, the portable terminal device 200 is folded such that a back face 40b (see FIG. 12B) of the upper housing 40 where the touch panel 11 is not mounted and a back face 50b (see FIGS. 12B, 12C) of the lower housing 50 that has only conventional hard keys 21 are contacted to each other.

In the portable terminal device 200, by operating a key (not shown), the upper housing 40 rotates approximately 180 degrees with respect to the lower housing 50 by the reversible structure 31a of the hinge 31, so that a folded posture illustrated in FIG. 12A shifts to a posture illustrated in FIG. 12B in which character input can be performed. In this posture, a surface 50a of the lower housing 50 that has hard keys 51 and a compact touch panel 52 mounted thereon and the surface 40a of the upper housing 40 that has the touch panel 11 mounted on the entire surface thereof are continuous to each other. The compact touch panel 52 has a function of the soft key area 11a according to each of the aforementioned embodiments. Furthermore, since distance between the hard keys 51 and compact touch panel 52 is small, one-hand character input is possible. In this way, in the posture illustrated FIG. 12B, character input by combining the compact touch panel 52 and hard keys 51 can be performed.

In the portable terminal device 200, the lower housing 50 is reversed 180 degrees with respect to the upper housing 40 by the biaxial structure 31b of the hinge 31, so that the posture illustrated in FIG. 12B shifts to the posture illustrated in FIG. 12C. In this posture, the back face 50b of the lower housing 50 that has the conventional hard keys 21 mounted thereon and the surface 40a of the upper housing 40 are continuous to each other. This enables conventional application resources and the like to be used in addition to ensuring character input using the conventional hard keys 21.

In the portable terminal device 200, the upper housing 40 rotates approximately 180 degrees with respect to the lower housing 50 by the reversible structure 31a of the hinge 31, so that the posture illustrated in FIG. 12C shifts to the posture illustrated in FIG. 12D. In this posture, the portable terminal device 200 is folded such that the surface 40a of the upper housing 40 and the back face 50b of the lower housing 50 are contacted to each other. This prevents the touch panel 11 mounted on the entire surface of the upper housing 40 from being exposed in the posture illustrated in FIG. 12D, thereby protecting the touch panel 11 from a flaw or dirt. In this posture, the compact touch panel 52 on the surface 50a of the lower housing 50 may be in a standby state.

Figure 13:
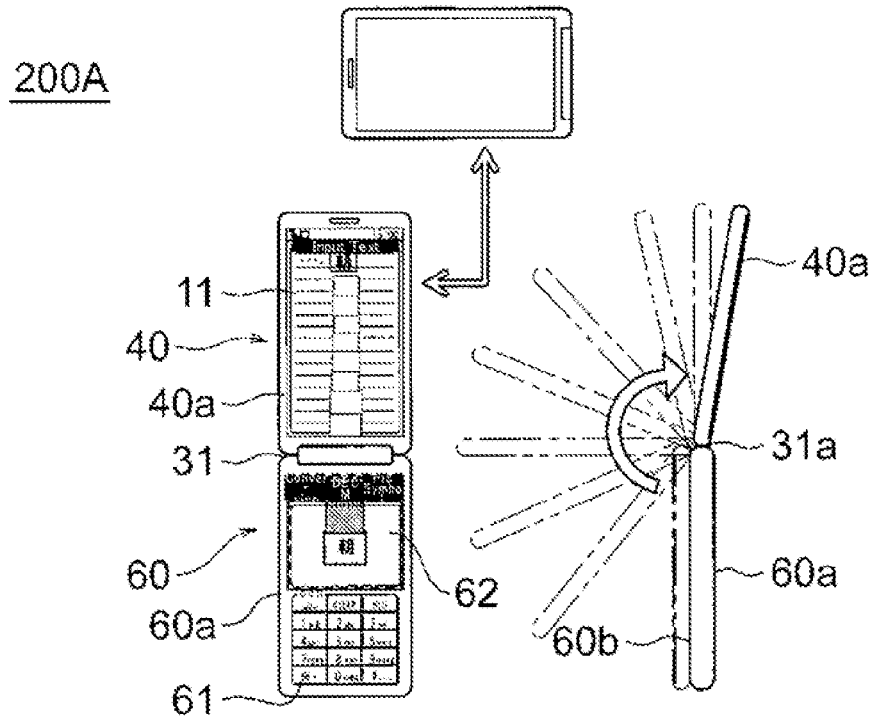
FIG. 13 is an outside view of a portable terminal device according to a first variation of the fifth embodiment.

FIG. 13 illustrates a portable terminal device according to a first variation of the fifth embodiment. FIG. 13 illustrates a front view of the housing in the fully open state, a view where the upper housing has been rotated in the fully open state, and a side view of the housing. A portable terminal device 200A according to the present variation is different from the portable terminal device 200 mainly in that in the former the hinge 31 has only a reversible structure 31a and a back face 60b of a lower housing 60 does not have conventional hard keys. During character input, the portable terminal device 200A has a posture in which a surface 60a of the lower housing 60 that has hard keys 61 and a compact touch panel 62 mounted thereon and a surface 40a of the upper housing 40 that has the touch panel 11 on the entire surface thereof are continuous to each other, as illustrated. In the portable terminal device 200A, since the lower housing 60 does not have conventional hard keys mounted on the back face 60b thereof, it is not possible to perform conventional character input. However, character input by combining the compact touch panel 62 and hard keys 61 can be performed.

Figure 14:
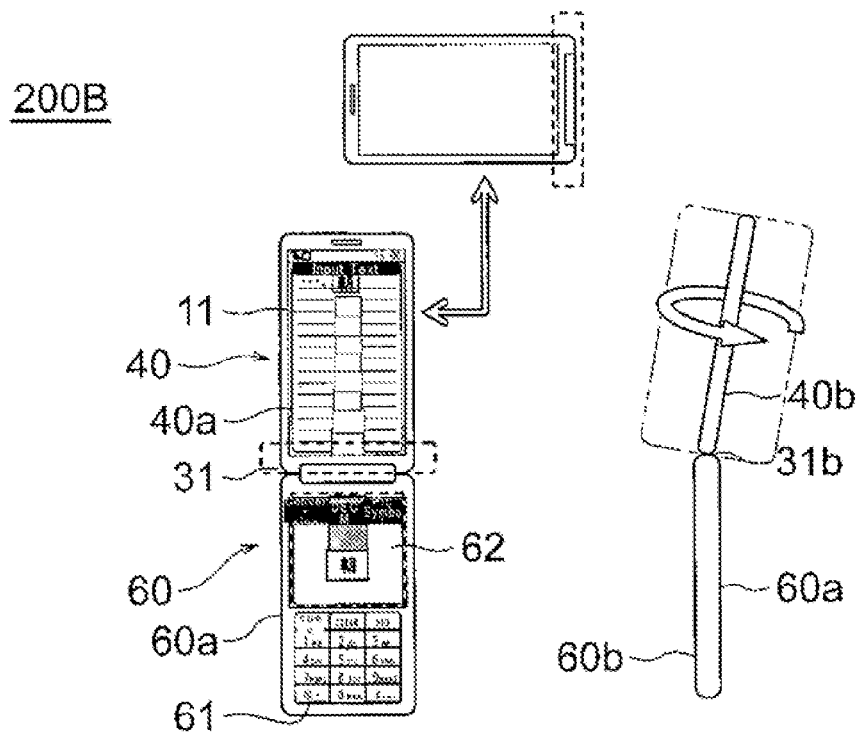
FIG. 14 is an outside view of a portable terminal device according to a second variation of the fifth embodiment.

FIG. 14 illustrates, in a similar manner of FIG. 13, a portable terminal device according to a second variation of the fifth embodiment. A portable terminal device 200B according to the present variation is different from the portable terminal device 200 mainly in that in the former the hinge 31 has only the biaxial structure 31b and the lower housing 60 does not have conventional hard keys mounted on the back face thereof. In the portable terminal device 200B, the upper housing 40 is reversed approximately 180 degrees with respect to the lower housing 60 by the biaxial structure 31b of the hinge 31, so that during character input the surface 60a of the lower housing 60 and the surface 40a of the upper housing 40 can be continuous to each other, as illustrated. While character input is not being performed, the portable terminal device 200B is folded such that the surface 60a of the lower housing 60 and a back face 40b of the upper housing 40 are continuous to each other and the surface 60a of the lower housing 60 and the back face 40b of the upper housing 40 are contacted to each other by the biaxial structure 31b of the hinge 31. This structure allows for various operations except for character input while the touch panel 11 of the upper housing 40 is exposed. Furthermore, in the portable terminal device 200B according to the present variation, since the lower housing 60 does not have conventional hard keys mounted on the back side 60b thereof, conventional character input cannot be performed; however, character input by combining the compact touch panel 62 and hard keys 61 can be performed.

Figure 15:
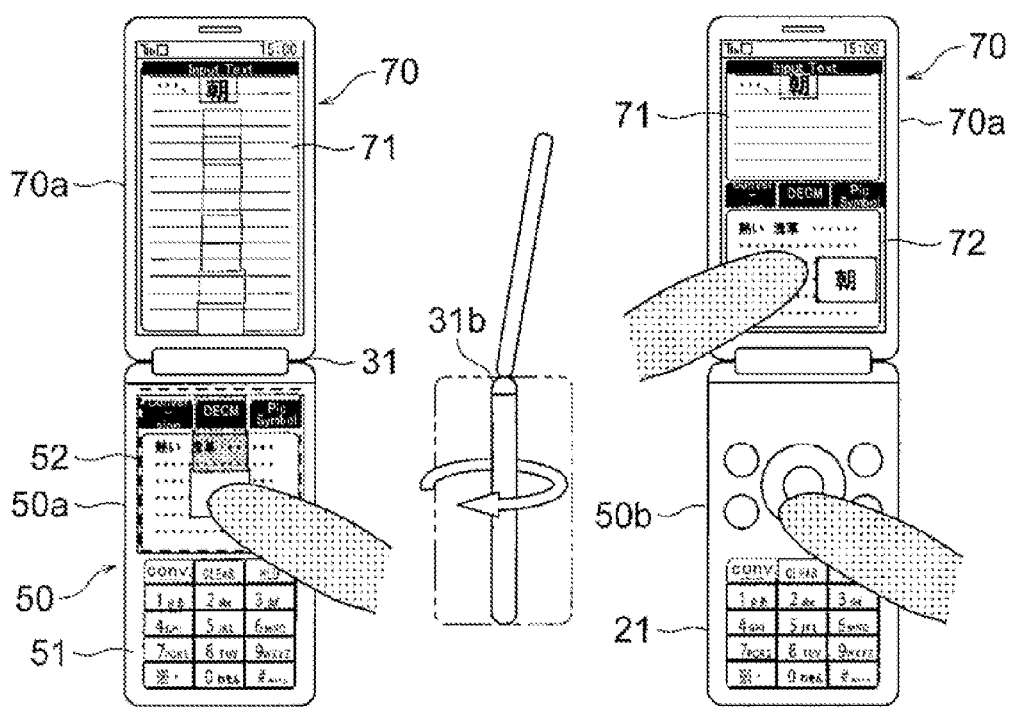
FIG. 15 is an outside view illustrating posture change of a housing of a portable terminal device according to a third variation of the fifth embodiment.

FIG. 15 illustrates a portable terminal device according to a third variation of the fifth embodiment. FIG. 15 shows that the lower housing is rotatable about an axis parallel to the housing surface with respect to the upper housing when the upper housing and lower housing are in the almost fully open position. A portable terminal device 200C according to the present variation is different from the portable terminal device 200 mainly in that the hinge 31 has only the biaxial structure 31b and a portion of a touch panel 71 mounted on an upper housing 70 has the same function as that of the compact touch panel 52 mounted on the lower housing 50. In the portable terminal device 200C, the lower housing 50 can be reversed approximately 180 degrees with respect to the upper housing 70 by the biaxial structure 31b of the hinge 31. During character input, the portable terminal device 200C has a posture in which the surface 50a of the lower housing 50 and the surface 70a of the upper housing 70 are continuous to each other as shown in the left illustration as well as a posture in which the back face 50b of the lower housing 50 and the surface 70a of the upper housing 70 are continuous to each other shown in the right illustration. In the posture shown in the left illustration, character input by combining the compact touch panel 52 and hard keys 51 can be performed.

In the posture shown in the right illustration, a soft key 72 having the same function as that of the aforementioned compact touch panel 52 is displayed on a portion of the touch panel 71 mounted on the upper housing 70. This not only allows for conventional character input by the hard keys 21 but also character input with both hands in which the hard keys 21 are operated with one hand and the soft key 72 on the upper housing 70 are secondarily operated with the other hand to select and decide a character candidate in the predictive conversion mode and the like.

Figure 16:
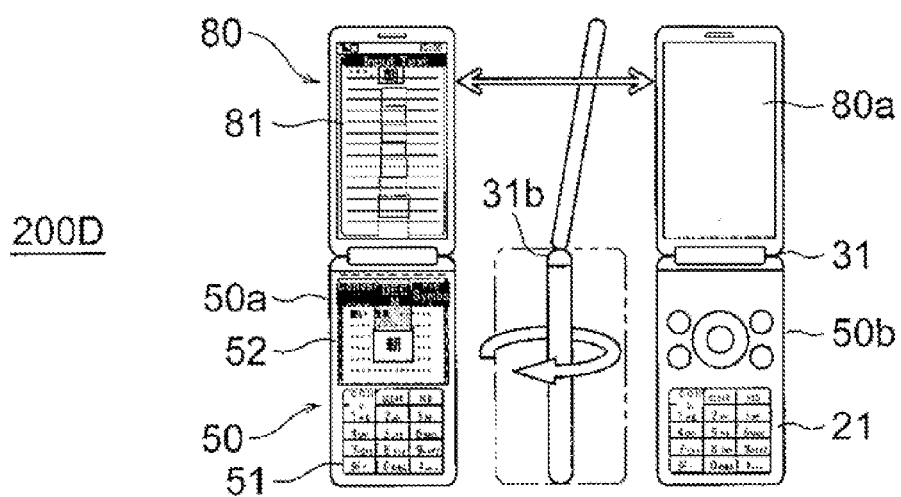
FIG. 16 is an outside view illustrating posture change of a housing of a portable terminal device according to a forth variation of the fifth embodiment.

FIG. 16 illustrates, in a similar manner of FIG. 15, a portable terminal device according to a forth variation of the fifth embodiment. A portable terminal device 200D according to the present variation is different from the portable terminal device 200C of FIG. 15 in that in the former a normal liquid crystal panel 81 is mounted on the entire surface of an upper housing 80 instead of a touch panel. In the portable terminal device 200D, character input by combining the compact touch panel 52 and hard keys 51 can be performed in the posture shown in the left illustration and conventional character input by the hard keys can be performed in the posture shown in the right illustration. Since the portable terminal device 200D does not have a touch panel on the entire surface of the upper housing 80, its cost of manufacturing can be reduced.

As described above, the portable terminal device according to the present invention can adopt the following modes. The soft key is not displayed in the vicinity of an edge of a display unit apart from the hard keys. This prevents the soft key from being displayed e.g. in a position where a thumb cannot reach and allows for smooth one-hand operation of the soft key and hard keys in the intermediate position.

The soft key includes a key corresponding to at least part of other hard keys than the part of hard keys that are not covered. This enables the soft key to complement character input function that at least part of covered hard keys have.

The portable terminal device according to the present invention has a plurality of intermediate positions, and corresponding to each of the intermediate positions a soft key for complementing the part of hard keys that are not covered is displayed in a position starting from an edge of the display unit adjacent to the part of hard keys that are not covered. In this case, each part of hard keys is exposed in a stepwise fashion in a position starting from an edge of the display unit, and therefore when character input is performed in the intermediate positions, the soft key is located, for example, in a thumb-reaching range from the position of the hard keys.

The plurality of intermediate positions are seamlessly selected, and in response to the selection the soft key seamlessly moves and is displayed. Such a visual movement display can emphasize novelty.

The soft key includes a key for displaying candidates predicted in the predictive conversion mode during character input by the hard keys. This enables the predictive conversion mode to be used in character input by combining the soft key and hard keys.

The soft key further includes a key for deciding a candidate in the normal conversion mode during character input by the hard keys. This enables the normal conversion mode to be used in character input by combining the soft key and hard keys.

A candidate is selected by a single-touch operation of the soft key that displays the candidate and then the candidate is decided by clearing the single-touch operation. This enables a candidate displayed in the soft key to be decided only by selecting with a thumb and removing the thumb, thereby allowing for quick character input.

When a candidate is decided, a visual display is performed such that the selected candidate is inserted into a character string on the display unit. This can produce a sense of speed and emphasize novelty during creating a character string.

In character input by the hard keys, an inputted character is decided only by double touch operation within an area displaying the soft key. This allows for quick character input when a character that does not require conversion is inputted.

In the upper housing, a key switch is disposed between an edge of the display unit and the corresponding edge of the upper housing. This configuration allows for character input by combining the soft key and hard keys in the intermediate position and further allows for operation by combining the soft key and key switch in the closed position. Furthermore, it is possible to reduce an area of the display unit of the upper housing and the cost of manufacturing.

The upper housing is rotatable with respect to the lower housing from the closed position on the same surface of a sliding surface. In this case, as one example, in a state where the upper housing rotates 90 degrees with respect to the lower housing from the closed position, quicker character input can be performed by the user's operating the hard keys with one hand and the soft key with the other hand. In a state where the upper housing rotates 180 degrees with respect to the lower housing from the closed position, the user can perform character input by combining the soft key and hard keys with one hand. As a result, the user can properly select a character input style depending on a situation.

The hinge couples the upper housing and lower housing so that they can be reversible and/or is rotatable about two axes. In this case, a plurality of positions for character input and a plurality of positions for folding can be adopted.

Another soft key having the same function of that of the soft key can be displayed on the display unit of the upper housing and is displayed in response to depressing a first hard key. In this case, character input can be performed only by the first hard key and also character input by combining said another soft key and the first hard key can be performed.

The present invention has been specifically illustrated and described with reference to exemplary embodiments. However, the present invention is not limited the embodiments and variations thereof. It should be obvious for a person skilled in the art that the present invention can be variously modified without departing from the spirit and scope of the present invention defined in the accompanying claims.

The present application is the National Phase of PCT/JP2008/072916, filed Dec. 17, 2008, which is based on Japanese Patent Application No. 2007-337262 filed on Dec. 27, 2007, claims priority thereof and incorporates the entire disclosure thereof to the specification of the present application by referring thereto.

The invention claimed is:

1. A portable terminal device comprising:
an upper housing that has a display unit on a surface thereof; and
a lower housing that has hard keys on a surface and is relatively slidably coupled to the upper housing,
both of the housings being movable between a closed position in which all of the hard keys of the lower housing are covered with the upper housing, at least one intermediate position in which part of the hard keys are not covered with the upper housing, and a fully open position in which none of the hard keys are covered with the upper housing, wherein
in the intermediate position, in response to depressing any of the part of the hard keys which are not covered, a soft key to complement the part of the hard keys which are not covered is displayed in a position starting from an edge of the display unit adjacent to the hard keys.

2. The portable terminal device according to claim 1, wherein the soft key is not displayed in a vicinity of an edge of the display unit apart from the hard keys.

3. The portable terminal device according to claim 1, wherein the soft key includes a key corresponding to at least part of other hard keys than the part of the hard keys which are not covered.

4. The portable terminal device according to claim 1, wherein the at least one intermediate position includes a plurality of intermediate positions, and corresponding to each of the plurality of intermediate positions, a soft key to complement the part of the hard keys which are not covered is displayed in a position starting from an edge of the display unit adjacent to the part of the hard keys which are not covered.

5. The portable terminal device according to claim 4, wherein the plurality of intermediate positions are seamlessly selected and in response to the selection the soft key is displayed so as to visually move in a seamless manner.

6. The portable terminal device according to claim 1, wherein the soft key includes a key to display a candidate predicted in a predictive conversion mode in character input using the hard keys.

7. The portable terminal device according to claim 6, wherein the soft key further includes a key for deciding a candidate in a normal conversion mode in character input using the hard keys.

8. The portable terminal device according to claim 6, wherein the candidate is selected by single touch operation of a soft key displaying the candidate and then is decided when the single touch operation is cleared.

9. The portable terminal device according to claim 6, wherein in the decision of the candidate, the selected candidate is displayed visually so as to be inserted into a character string on the display unit.

10. The portable terminal device according to claim 6, wherein in character input using the hard keys, an inputted character is decided by double touch operation within an area displaying the soft key.

11. The portable terminal device according to claim 1, wherein the upper housing has a key switch disposed between an edge of the display unit and a corresponding edge of the upper housing.

12. The portable terminal device according to claim 1, wherein the upper housing is rotatable with respect to the lower housing from the closed position on the same surface as a sliding surface.

13. A portable terminal device comprising:
an upper housing that has a display unit on a surface thereof; and
a lower housing that has hard keys on a surface and is relatively slidably coupled to the upper housing,
both of the housings being movable between a closed position in which all of the hard keys of the lower housing are covered with the upper housing, a plurality of intermediate positions in which part of the hard keys are not covered with the upper housing, and a fully open position in which none of the hard keys are covered with the upper housing, wherein
in the plurality of intermediate positions, corresponding to each of the plurality of intermediate positions, a soft key to complement the part of the hard keys which are not covered is displayed in a position starting from an edge of the display unit adjacent to the part of the hard keys which are not covered.

14. The portable terminal device according to claim 13, wherein the intermediate positions are seamlessly selected and in response to the selection the soft key is displayed so as to visually move in a seamless manner.

15. A portable terminal device comprising:
an upper housing having a first display unit on a surface thereof; and
a lower housing having a first surface and a second surface and being rotatably coupled to the upper housing with a hinge, wherein
the lower housing includes first hard keys on the first surface; second hard keys on the second surface and having a same function as at least a part of the first hard keys do; and a second display unit adjacent to the second hard keys on the second surface,
the second display unit displaying a soft key to complement the second hard keys.

16. The portable terminal device according to claim 15, wherein the hinge couples the upper housing and the lower housing such that they can be reversible and/or are rotatable about two axes.

17. The portable terminal device according to claim 15, wherein another soft key having the same function as that of the soft key can be displayed on the first display unit of the upper housing and is displayed in response to depressing the first hard keys.

* * * * *